April 27, 1943.   S. A. WHITT ET AL   2,317,572
DIRECT SURFACE INTERCOOLER
Filed Feb. 28, 1942   2 Sheets-Sheet 1

INVENTORS
Sidney A. Whitt and
Stanislaus Pryborowski
BY
Albert R. Henry
ATTORNEY April 27, 1943.    S. A. WHITT ET AL    2,317,572
DIRECT SURFACE INTERCOOLER
Filed Feb. 28, 1942    2 Sheets-Sheet 2
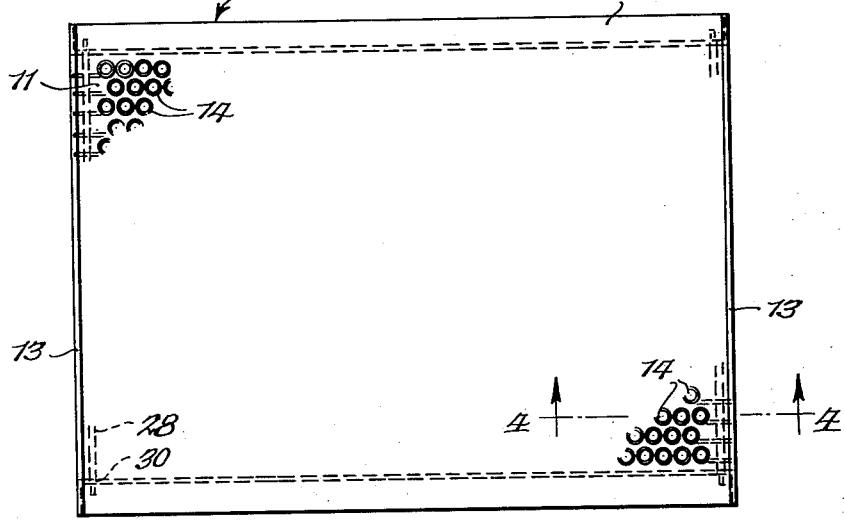
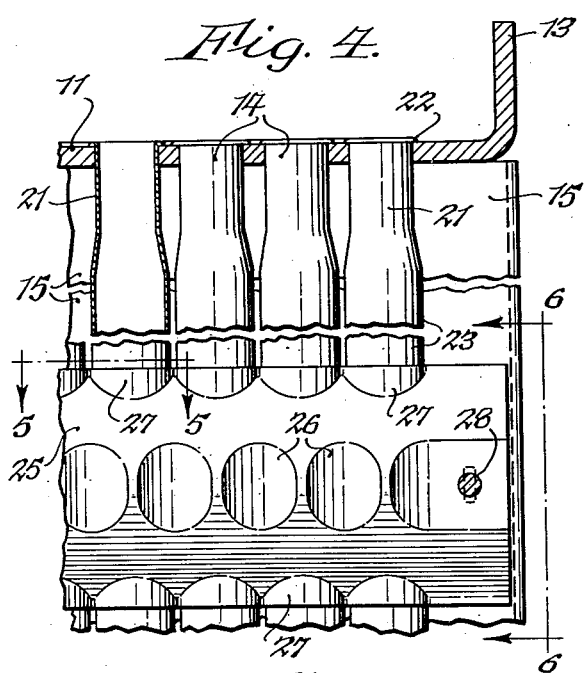
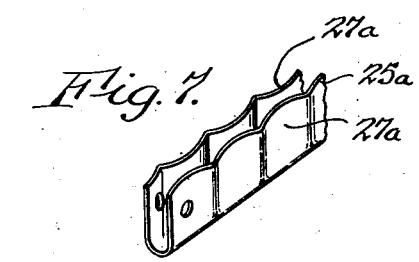
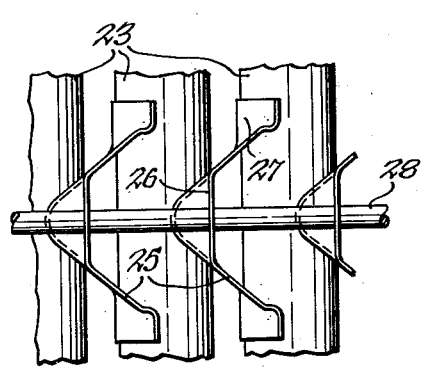
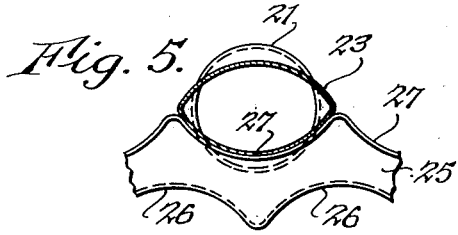
INVENTORS
Sidney A. Whitt and
Stanislaus Przyborowski
BY
Albert R. Henry
ATTORNEY Patented Apr. 27, 1943

2,317,572

UNITED STATES PATENT OFFICE 2,317,572

DIRECT SURFACE INTERCOOLER

Sidney A. Whitt, Buffalo, and Stanislaus Przyborowski, Tonawanda, N. Y., assignors to Fedders Manufacturing Company, Inc., Buffalo, N. Y.

Application February 28, 1942, Serial No. 432,846

4 Claims. (Cl. 257—236)

This invention relates to heat exchange apparatus particularly applicable to the cooling of air supplied to an airplane engine, and it has for its main object the provision of an intercooler having a high thermal capacity, low weight, and a long life in service.

Airplanes operating at relatively high altitudes employ superchargers to compress the rarefied air, but, since the compression increases the temperature of the air above a desired point, means should also be provided to cool the air before delivery to the engine. This can be effected by passing the supercharger output in heat exchange relation with atmospheric air, but service conditions require an intercooler of low weight and great durability. The present invention proposes improvements in coolers of this class, whereby the thermal capacity is greatly increased, and the apparatus is made so rugged that it can withstand the vibratory strains imposed by flight conditions.

A typical embodiment of the invention is illustrated in the accompanying drawings, wherein:

Fig. 3 is a top view, taken on the line 3—3 of Fig. 2;

Fig. 4 is an enlarged fragmentary section, taken on the line 4—4 of Fig. 3;

Figure 1:
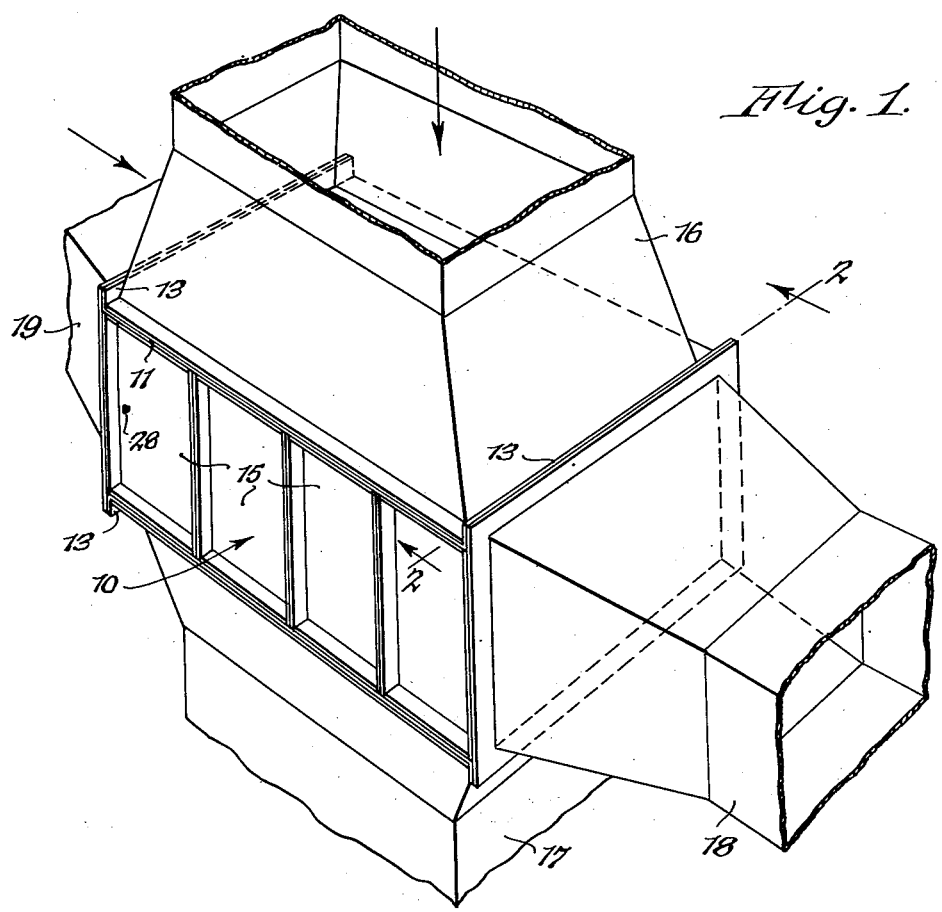
Fig. 1 is a perspective of an intercooler set up for service conditions.

Figs. 5 and 6 are details taken on the lines 5—5 and 6—6 of Fig. 4; and,

Fig. 7 is a perspective of a modified dampening member.

The intercooler 10 comprises upper and lower header plates 11 and 12, each provided with end flanges 13, and between which extend a large number of tubes 14 of relatively small diameter. The unit is closed off at two opposite sides by a plurality of flanged rectilinear plates 15 disposed in abutting relation, thereby to provide a heat exchange apparatus in which flow can take place both through the tubes and around the tubes. In use, the header plates are fitted with duct members 16 and 17 to direct cold air through the tubes 14, while the open faces are similarly provided with ducts 18 and 19 for hot supercharger air which flows around the tubes from one end of the core to the other, and then to the engine. As the details of installation are no part of the invention, they need not be further illustrated or described.

Figure 2:
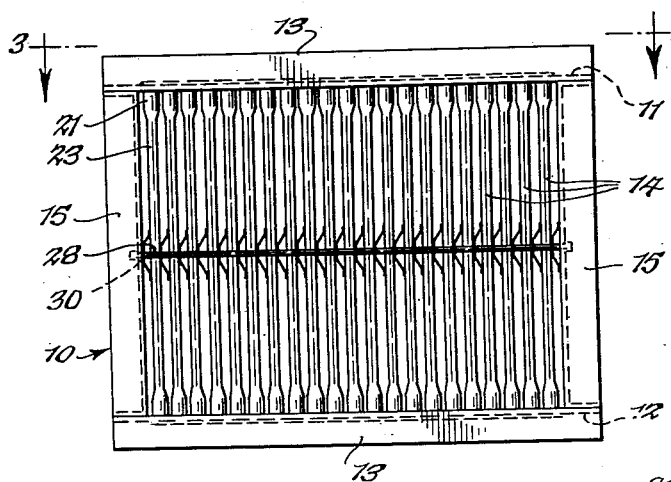
Fig. 2 is an elevation of the cooler, taken on the line 2—2 of Fig. 1.

As shown in Figs. 2, 3, and 4, each header plate is formed with a plurality of holes—frequently as many as three thousand or more at a close spacing—which receive the ends of the tubes 14. These tube ends, as indicated in Fig. 4 by the reference numeral 21, are of cross section to accommodate the apertures. After insertion, the extremities of the tubes are spun down to provide a flange 22 for securing the tubes in fixed position. A major portion of each tube is not cylindrical, however, but is formed with a modified elliptical section 23, as best shown in Fig. 5, with the major axis disposed in the path of the air flow. There are several reasons for this construction. It has been found that the circular tube ends can be spun down tightly with the elimination of leaks and without cracking, whereas this could not be done well if the ends were elliptical. The oval section throughout the working area, however, increases the heat transfer capacity as much as ten to fifteen per cent or more, which, in apparatus of this nature, is a very substantial improvement.

Further, the positioning of the tubes in such manner as to locate the major axes parallel to the side walls 15, and in the direction of air flow, increases the areodynamic values and decreases the pressure drop through the core.

In a more specific aspect, it is preferred that the cross-sectional shape of a section 23 depart from a true ellipse to the extent that the ends be nearly pointed. In the presence of high pressure waves, as might result from backfire, it has been found that this shape is most effective, not only to resist collapse or rupture, but stresses resulting from sudden impact and vibratory forces in cooperation with means hereinafter described.

Good results are obtained, in tubes of the size herein referred to, if the cylindrical portion is deformed to impart substantially a three-to-two to a five-to-three ratio between the major and minor axis. This will develop a section which produces the increase in capacity above mentioned.

Probably the most destructive force to which apparatus of this nature is subjected are the vibrations set up during critical operating conditions of the aircraft in which it is installed. These do not have any fixed period, because variations in speed and engine revolutions create vibrations in the tubes 14 of different frequency and amplitude. The matter of dampening these vibrations without adversely affecting the desired properties of the intercooler therefore presents a problem, which can be solved, however, by the comparatively simple expedient shown in Figs. 4 to 6.

Spacer members 25, also disposed longitudinally of the path of the air flow, are inserted at the mid portions of the tubes 14, or at intervals suitable to the particular tube length-diameter ratio, to contact the tubes of adjacent rows. Each spacer consists of a light metal strip bent into an arch or flat V-section, and formed with spaced saddles 26 at the center terminal or apex, and with other spaced saddles 27 formed along the marginal terminals or wings. These saddles respectively engage the oval portions 23 of the tubes in adjacent rows, and thus dampen the vibrations which are set up.

The formation of the strip 25 imparts appreciable resiliency and resistance to deformation, and therefore the strips may be laid up as the tubes are inserted in the headers 11 and 12, and will be retained by the frictional engagement and compressive force to which they are subjected. As an added percaution, the strips may be tied by rods 28 which extend through the ends at the faces of the core, and which pass through holes 30 in the side plates 15, as shown in Fig. 2.

With the air streams applied as indicated in Fig. 1, it will be understood that a considerable load is placed on the plates 11 and 12. For example, the supercharger air-cooling air differential may be as high as thirty pounds per square inch. The disclosed structures absorbs this load in such fashion as to insure against the dangers of load localization, since the tubes 14 act as tie rods between the plates, which in turn are interconnected for mutual support by the spacer members 25. The members 25 are sufficiently resilient to permit slight yielding of any tubes which may require self-adjustment, and thus to effect a more favorable distribution of the load throughout the structure.

A modified form of dampening strip 25a is shown in Fig. 7, wherein the strip is bent more into a U-shape, each marginal portion of which is formed with saddles 27a to engage the tubes in the manner just described. It may further be noted that aluminum or its alloys may be employed as the metal for all parts, and that they may also be welded or otherwise secured as desired.

While the invention has been described with reference to a preferred embodiment, it is intended that it should be deemed commensurate with the scope of the following claims.

We claim:

1. An intercooler for airplanes comprising upper and lower header plates, a plurality of tubes connected to and extending between the header plates, side plates on opposite sides of the header plates and tubes to form a heat interchanger in which flow may take place through the tubes and in one direction around the tubes, and dampening strips disposed between the tubes and engaging the midportions of tubes in adjacent rows, said strips comprising a bent sheet metal section having a flexible portion and terminal portions, said connected terminal portions being formed with spaced saddles engaging a row of tubes, and said flexible portion serving as a resilient strut between adjacent rows of tubes.

2. An intercooler for airplanes comprising upper and lower header plates, a plurality of tubes connected to and extending between the header plates, said tubes having circular sections at the plates and having substantially oval sections throughout the major portion of their lengths between the plates, the major axes of the tubes taken through the oval sections being aligned in a direction from the face to the back of the intercooler, and dampening strips positioned in the same direction and disposed between the tubes of adjacent rows, said strips having saddles engaging the tubes and said strips being disposed at the mid-region between the header plates.

3. An intercooler for airplanes comprising upper and lower header plates formed with a plurality of aligned and closely spaced apertures, tubes formed with circular ends and oval midportions positioned in said apertures to extend between the plates, the extremities of the tubes being spun down against the plates, the oval portions of the tubes being so disposed that their major axes extend from the face to the back of the intercooler, dampening strips positioned intermediate the header plates and between adjacent rows of tubes, said strips extending from the face to the back of the intercooler, said strips having marginal portions formed with saddles engaging said tubes.

4. An intercooler for airplanes comprising upper and lower header plates, a plurality of tubes extending between and interconnecting said plates, spacer strips disposed between adjacent rows of tubes and firmly engaging the same, said strips being aligned from face to back of the intercooler and being positioned midway between the header plates, said strips having a V-section with spaced saddles formed along the marginal and central portions, said saddles engaging the tubes.

SIDNEY A. WHITT.
STANISLAUS PRZYBOROWSKI.